US00RE50597E

(19) United States
(12) Reissued Patent
Prushinskiy et al.

(10) Patent Number: US RE50,597 E
(45) Date of Reissued Patent: Sep. 23, 2025

(54) FOLDABLE DISPLAY

(71) Applicant: Samsung Display Co., Ltd., Yongin-si (KR)

(72) Inventors: Valeriy Prushinskiy, Hwaseong-si (KR); Minsoo Kim, Seoul (KR)

(73) Assignee: SAMSUNG DISPLAY CO., LTD., Gyeonggi-Do (KR)

(21) Appl. No.: 17/893,741

(22) Filed: Aug. 23, 2022

Related U.S. Patent Documents

Reissue of:
(64) Patent No.: 9,841,937
Issued: Dec. 12, 2017
Appl. No.: 14/843,820
Filed: Sep. 2, 2015

U.S. Applications:
(63) Continuation of application No. 16/707,841, filed on Dec. 9, 2019, now Pat. No. Re. 49,193, which is an application for the reissue of Pat. No. 9,841,937.

(30) Foreign Application Priority Data

Feb. 24, 2015 (KR) ..... 10-2015-0025965

(51) Int. Cl.
*G06F 1/16* (2006.01)
*G06F 1/3218* (2019.01)
*G06F 1/3234* (2019.01)
*G06F 1/3287* (2019.01)
(Continued)

(52) U.S. Cl.
CPC ..... *G06F 1/1618* (2013.01); *G06F 1/1601* (2013.01); *G06F 1/163* (2013.01);
(Continued)

(58) Field of Classification Search
CPC .. G06F 3/1431; G06F 3/04886; G06F 1/1618; G06F 1/3265; G06F 1/1652;
(Continued)

(56) References Cited

U.S. PATENT DOCUMENTS 5,622,384 A * 4/1997 Bradley ..... B42D 15/042 283/117
8,933,874 B2 1/2015 Lundqvist et al.
(Continued)

FOREIGN PATENT DOCUMENTS

KR 10-2005-0073874 7/2005
KR 10-2005-0073874 A 7/2005
(Continued)

*Primary Examiner* — Jeffrey D Carlson
(74) *Attorney, Agent, or Firm* — CANTOR COLBURN LLP

(57) ABSTRACT

A foldable display is disclosed. In one aspect, the foldable display includes a foldable display panel including first to fourth regions adjacent to each other. The foldable display also includes a first support located on a rear surface of the first region and a second support located on a rear surface of the fourth region. The foldable display panel is configured to be arranged in a first configuration in which the foldable display panel is unfolded and a second configuration in which the foldable display panel is folded so that the first support supports the first and second regions and the second support supports the third and fourth regions.

21 Claims, 8 Drawing Sheets

(51) Int. Cl.

| | |
|---|---|
| ***G06F 3/02*** | (2006.01) |
| ***G06F 3/04886*** | (2022.01) |
| ***G06F 3/14*** | (2006.01) |
| ***G09G 3/00*** | (2006.01) |
| ***G09G 3/3208*** | (2016.01) |
| ***G09G 3/34*** | (2006.01) |

(52) U.S. Cl.
CPC ..... *G06F 1/1652* (2013.01); *G06F 1/1677* (2013.01); *G06F 1/3218* (2013.01); *G06F 1/3265* (2013.01); *G06F 1/3287* (2013.01); *G06F 3/0227* (2013.01); *G06F 3/04886* (2013.01); *G06F 3/1431* (2013.01); *G09G 3/035* (2020.08); *G09G 3/3208* (2013.01); *G09G 3/344* (2013.01); *G06F 2200/1614* (2013.01)

(58) Field of Classification Search
CPC ..... G06F 1/163; G06F 1/3218; G06F 1/3287; G06F 1/1677; G06F 1/1601; G06F 3/0227; G06F 2200/1614; G06F 3/048; G09G 3/3208; G09G 3/344; G09G 2380/02; Y02D 10/00; G09F 9/301
See application file for complete search history.

(56) References Cited

U.S. PATENT DOCUMENTS

| | | | | |
|---|---|---|---|---|
| 9,009,984 | B2 | 4/2015 | Caskey et al. | |
| 9,013,458 | B2 | 4/2015 | Cho et al. | |
| 2004/0231203 | A1 | 11/2004 | Dobelbower et al. | |
| 2008/0144265 | A1* | 6/2008 | Aoki | G06F 1/1601 361/679.04 |
| 2009/0275366 | A1* | 11/2009 | Schilling | G06F 1/1615 455/566 |
| 2010/0201604 | A1* | 8/2010 | Kee | G06F 1/1616 345/1.3 |
| 2011/0216064 | A1* | 9/2011 | Dahl | G06F 1/1616 345/428 |
| 2013/0127917 | A1* | 5/2013 | Kwack | G06F 1/1652 345/660 |
| 2014/0049911 | A1* | 2/2014 | Corbin | A45C 13/002 361/679.58 |
| 2014/0226275 | A1 | 8/2014 | Ko et al. | |
| 2014/0247252 | A1 | 9/2014 | Lee | |
| 2015/0248149 | A1* | 9/2015 | Yamazaki | G06F 1/263 361/679.27 |
| 2016/0132281 | A1* | 5/2016 | Yamazaki | G06F 3/1446 345/1.3 |

FOREIGN PATENT DOCUMENTS

| | | |
|---|---|---|
| KR | 10-2012-0117140 | 10/2012 |
| KR | 10-2012-0117140 A | 10/2012 |
| KR | 10-2013-0071204 | 6/2013 |
| KR | 10-2013-0071204 A | 6/2013 |
| KR | 10-1320252 | 10/2013 |
| KR | 10-2014-0033625 | 3/2014 |
| KR | 10-2014-0033625 A | 3/2014 |
| KR | 10-2014-0115913 | 10/2014 |

* cited by examiner

FOLDABLE DISPLAY

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

[This U.S. non-provisional patent application claims priority under 35 U.S.C. §119 of Korean Patent Application No. 10-2015-0025965, filed on Feb. 24, 2015, the entire contents of which are hereby incorporated by reference.] *This is a continuation reissue application of U.S. patent application No. 16/707,841 filed Dec. 9, 2019, now U.S. Pat. No. RE 49,193 issued Aug. 30, 2022. U.S. patent application No. 16/707,841 is a reissue application of U.S. Pat. No. 9,841,937 issued Dec. 12, 2017, which issued from U.S. patent application No. 14/843,820 filed Sep. 2, 2015. U.S. Pat. No. 9,841,937 claims priority benefit of Korean Patent Application No. 10-2015-0025965, filed on Feb. 24, 2015, in the Korean Intellectual Property Office, the disclosure of which is incorporated herein in its entirety for all purposes. This application is also a reissue application of U.S. Pat. No. 9,841,937.*

BACKGROUND

Field

The described technology generally relates to a foldable display.

Description of the Related Technology

Display devices include various electronic components for displaying images. Example display devices include televisions, computer monitors, personal digital assistants (PDAs), and smart devices.

Certain display devices, such as organic light-emitting diode (OLED) displays, liquid crystal displays (LCDs), plasma display panels (PDPs), or electrophoretic displays (EPDs) can be manufactured to display high-definition images.

In recent years, foldable displays which can be arranged into various configurations for portability and various other uses have been developed. Users can use foldable displays more easily and more efficiently by adjusting the available surface area in a display region via folding or unfolding the foldable displays into different configurations.

SUMMARY OF CERTAIN INVENTIVE ASPECTS

One inventive aspect is a foldable display that is convertible into various configurations and freely changeable according to an intended purpose of a user.

Another aspect is a foldable display including a foldable display panel including a first region and a second region adjacent to each other in a horizontal direction, and a third region and a fourth region adjacent to each other in the horizontal direction; a first body located on a rear surface of the first region; and a second body located on a rear surface of the fourth region. The foldable display panel includes a first configuration in which the foldable display panel is unfolded such that the first body supports the first region and the second body supports the fourth region, and a second configuration in which the foldable display panel is folded such that the first body supports the first region and the second region and the second body supports the third region and the fourth region.

In some embodiments, the first body can include a first coupling portion and the second body can include a second coupling portion. The first coupling portion and the second coupling portion are connected to each other in the second configuration of the foldable display.

In other embodiments, the first and second coupling portions can have different magnetic polarities from each other.

In still other embodiments, the second configuration can be a configuration in which the foldable display panel is folded along a boundary line between the first and second regions such that the first body is arranged on rear surfaces of the first and second regions to support the first and second regions at the same time, and the foldable display panel is folded along a boundary line between the third and fourth regions such that the second body is arranged on rear surfaces of the third and fourth regions to support the third and fourth regions at the same time.

In even other embodiments, the foldable display panel can have a third configuration in which the first and second coupling portions are connected to each other such that the first and second bodies form a right angle and the second and third regions are curved.

In yet other embodiments, the foldable display panel can have a fourth configuration in which the foldable display panel is folded such that the first and second bodies overlap each other and the second and third regions are curved.

In further embodiments, the foldable display can further include: a folding sensor sensing the configuration of the foldable display panel; and a controller communicating with the folding sensor to detect the configuration of the foldable display panel and controlling the foldable display panel on the basis of the detected result.

In still further embodiments, when detecting the second configuration, the controller can control the foldable display panel such that the first and fourth regions display a first input interface and a second input interface, respectively.

In even further embodiments, the second input interface can be an interface continuing from the first input interface.

In yet further embodiments, the first and second interfaces can be keyboard input interfaces.

In much further embodiments, when detecting a conversion from the first configuration to the second configuration, the controller can control the foldable display panel such that the first and fourth regions display interfaces with respect to images which the second and third regions display in the first configuration.

In still much further embodiments, when detecting the third configuration, the controller can control the foldable display panel such that the second and third regions are activated.

In even much further embodiments, when detecting the fourth configuration, the controller can control the foldable display panel such that the first or fourth region is inactivated.

In yet much further embodiments, sizes of the first and second regions can be substantially the same, and sizes of the third and fourth regions can be substantially the same.

Another aspect is a foldable display comprising a foldable display panel including: i) a first region and a second region adjacent to each other in a first direction, and ii) a third region and a fourth region adjacent to each other in the first direction; a first support located on a rear surface of the first region; and a second support located on a rear surface of the fourth region, wherein the foldable display panel is configured to be arranged in a first configuration in which the foldable display panel is unfolded so that the first support supports the first region and the second support supports the fourth region, and wherein the foldable display panel is further configured to be arranged in a second configuration in which the foldable display panel is folded so that the first support supports the first region and the second region and the second support supports the third region and the fourth region.

In exemplary embodiments, the first body comprises a first coupling portion and the second body comprises a second coupling portion, wherein the first coupling portion and the second coupling portion are configured to be connected to each other in the second configuration of the foldable display panel. The first coupling portion and the second coupling portion can have different magnetic polarities from each other.

In exemplary embodiments, the second configuration is a configuration in which: i) the foldable display panel is folded along a boundary line between the first and second regions such that the first support is arranged on rear surfaces of the first and second regions to support the first and second regions at the same time, and ii) the foldable display is folded along a boundary line between the third and fourth regions such that the second support is arranged on rear surfaces of the third and fourth regions to support the third and fourth regions at the same time.

In exemplary embodiments, the foldable display panel is further configured to be arranged in a third configuration in which the first and second coupling portions are connected to each other such that the first support and the second support form a right angle and the second region and the third region are curved. The foldable display panel can be further configured to be arranged in a fourth configuration in which the foldable display panel is folded such that the first support and the second support overlap each other and the second region and the third region are curved.

In exemplary embodiments, the foldable display further comprises a folding sensor configured to sense the configuration of the foldable display panel; and a controller configured to: i) communicate with the folding sensor to detect the configuration of the foldable display panel, and ii) control the foldable display panel based on the detected configuration. The controller can be further configured to control the foldable display panel such that the first region displays a first input interface and the fourth region displays a second input interface when the controller detects that the foldable display panel is in the second configuration. The second input interface can continue from the first input interface. The first interface and the second interface can be keyboard input interfaces.

In exemplary embodiments, the controller in further configured to control the foldable display panel such that the first region displays the first input inter face and the fourth region displays the second input interface when the controller detects a conversion of the foldable display panel from the first configuration to the second configuration, and wherein the first input interface and the second input interface are interfaces that are based on images displayed by the second and third regions in the first configuration.

In exemplary embodiments, the controller is further configured to control the foldable display panel such that the second and third regions are activated when the controller detects that the foldable display panel is in the third configuration. The controller can be further configured to control the foldable display such panel that the first or fourth region is inactive when the controller detects that the foldable display panel is in the fourth configuration. The sizes of the first and second regions can be substantially the same and wherein the sizes of the third and fourth regions can be substantially the same.

BRIEF DESCRIPTION OF THE DRAWINGS

The accompanying drawings are included to provide a further understanding of the described technology and are incorporated in and constitute a part of this specification. The drawings illustrate exemplary embodiments of the described technology and, together with the description, serve to explain principles of the described technology.

DETAILED DESCRIPTION OF CERTAIN INVENTIVE EMBODIMENTS

The terms used in this specification are selected as a general terms that are widely used while considering the functions of the present specification. Also, in certain cases, the meanings of terms will be defined in the description of the corresponding embodiment. Accordingly, a term used herein shall be interpreted based on practical meanings and the contents throughout the specification instead of the simple label of the term.

Moreover, although exemplary embodiments are described in detail with reference to the accompanying drawings and contents described therein, the described technology is not limited or restricted by the exemplary embodiments.

Hereinafter, exemplary embodiments of the described technology will be described in detail with reference to the accompanying drawings.

Figure 1A:
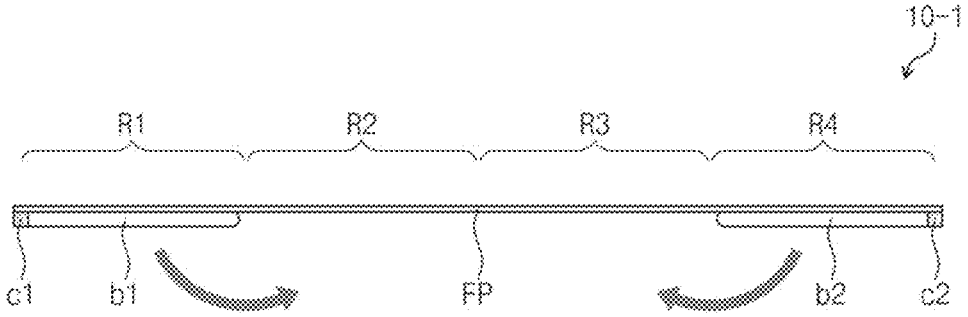
FIG. 1A illustrates a side view of a foldable display including a foldable display panel in a first configuration.
Figure 1B:
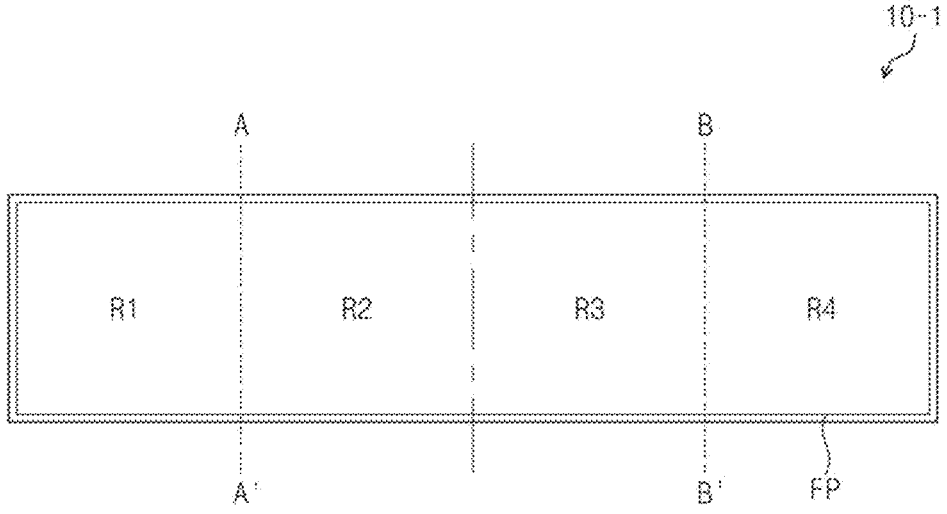
FIG. 1B illustrates a front view of the foldable display illustrated in FIG. 1A.
Figure 2A:
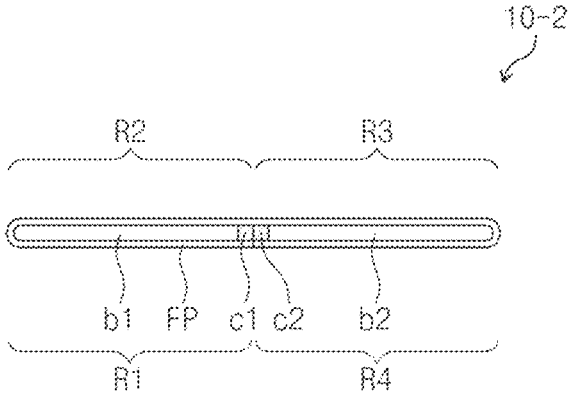
FIG. 2A illustrates a side view of a foldable display including a foldable display panel in a second configuration.
Figure 2B:
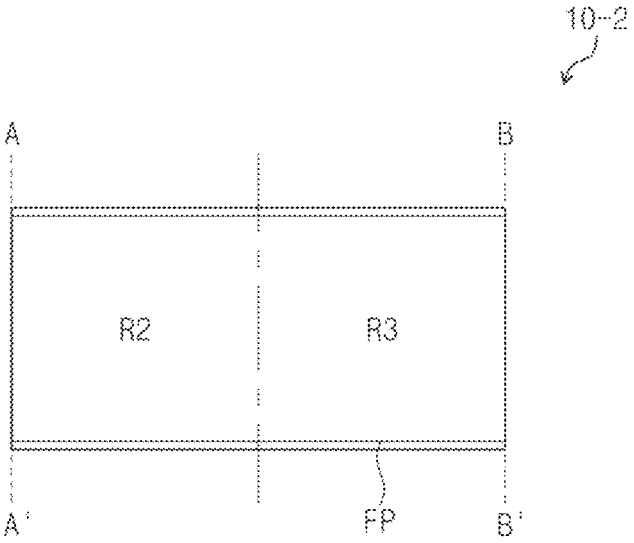
FIG. 2B illustrates a front view of the foldable display illustrated in FIG. 2A.

FIG. 1A illustrates a side view of a foldable display including a foldable display panel in a first configuration. FIG. 1B illustrates a front view of the foldable display illustrated in FIG. 1A. FIG. 2A illustrates a side view of a foldable display including a foldable display panel in a second configuration. FIG. 2B illustrates a front view of the foldable display illustrated in FIG. 2A.

Referring to FIGS. 1A to 2B, a foldable display 10-1 or 10-2 includes a foldable display panel FP and a hard material body supporting a specific region of the foldable display panel FP.

The foldable display panel FP may include first to fourth regions R1 to R4. More specifically, the foldable display panel FP includes the first and second regions R1 and R2 formed adjacent to each other in a horizontal direction and the third and fourth regions R3 and R4 formed adjacent to each other in the horizontal direction. The size and shape of the first region R1 can be substantially the same as that of the second region R2, and the size and shape of the third region R3 can be substantially the same as that of the fourth region R4.

The foldable display 10-1 or 10-2 can include first and second bodies or supports b1 and b2 supporting at least two regions of the first to fourth regions R1 to R4. In particular, in the present specification, the foldable display 10-1 or 10-2 can include the first and second bodies b1 and b2 respectively supporting the first and fourth regions R1 and R4. The first body b1 can be located on a rear surface of the first region R1 so as to support the first region R1 and can be formed of a hard or rigid material. The rear surface of the first region R1 can be attached to one surface of the first body b1. Similarly, the second body b2 can be also located on a rear surface of the fourth region R4 so as to support the fourth region R4 and can be formed of a hard or rigid material. The rear surface of the fourth region R4 can be attached to one surface of the second body b2.

The size of the first body bl can be substantially equal to or less than that of the first region R1. The size of the second body b2 can be substantially equal to or less than that of the fourth region R4.

In the present specification, the foldable display panel FP can have folded configurations that are classified into first to fourth configurations. The spatial relationships between the first to fourth regions R1 to R4 and the first and second bodies b1 and b2 can be also altered according to the folded configurations of the foldable display panel FP.

Referring to FIGS. 1A and 1B, the first configuration indicates a configuration in which the foldable display panel FP is unfolded such that the first body b1 supports the first region R1 and the second body b2 supports the second region R2. That is, the first configuration indicates a configuration in which all the first to fourth regions R1 to R4 of the foldable display panel FP are exposed to the environment. Therefore, the foldable display panel FP in the first configuration can provide a display screen having the widest display region. When a user wants to use a wide screen, the user can arrange the foldable display panel FP in the first configuration to use all the first to fourth regions R1 to R4 of the foldable display panel FP.

Referring to FIGS. 2A and 2B, the second configuration indicates a configuration in which the foldable display panel FP is folded such that the first body b1 supports the first and second regions R1 and R2, and the second body b2 supports the third and fourth regions R3 and R4. More specifically, the second configuration indicates a configuration in which the foldable display panel FP is folded along a boundary line A-A' between the first and second regions R1 and R2 such that the first body b1 is arranged on rear surfaces of the first and second regions R1 and R2 to support the first and second regions R1 and R2 at the same time. Also, the second configuration indicates a configuration in which the foldable display panel FP is folded along a boundary line B-B' between the third and fourth regions R3 and R4 such that the second body b2 is arranged on rear surfaces of the third and fourth regions R3 and R4 to support the third and fourth regions R3 and R4 at the same time. In the second configuration, the other surface of the first body b1 and the other surface of the second body b2 can be respectively arranged on a rear surface of the second region R2 and a rear surface of the third region R3. For example, the first body b1 may be in close contact with the first and second regions R1 and R2 and the second body b2 may be in close contact with the third and fourth regions R3 and R4 to aid in maintaining the shape of the respective regions R1 to R4. That is, the first and second bodies b1 and b2 can provide structural stability to the first to fourth regions R1 to R4 when in contact therewith.

Thus, the first to fourth regions R1 to R4 are arranged on both surfaces of the foldable display panel FP, so that the foldable display 10-2 can have a similar structure to a double-side display. Therefore, in the second configuration, the foldable display 10-2 can operate in a similar manner to a dual-side display. That is, the first to fourth regions R1 to R4 can be activated at the same time to display images in opposite directions.

The first and second bodies b1 and b2 can have predetermined shape(s) and thickness(es). As a result, in the second configuration, the folded region(s) of the foldable display panel FP can have a constant radius of curvature. More specifically, a cross-section of a first folded region corresponding to the boundary line A-A' between the first and second regions R1 and R2 and a cross-section of a second folded region corresponding to the boundary line B-B' between the third and fourth regions R3 and R4 can have a constant radius of curvature. For example, the cross-section of each of the first and second folded regions can have a radius of curvature of about 7 mm to about 8 mm.

The first and second bodies b1 and b2 can include coupling portions for stably maintaining the second configuration. More specifically, the first body b1 and the second body b2 can respectively include a first coupling portion c1 and a second coupling portion c2. The first and second coupling portions c1 and c2 can be connected to each other in the second configuration to allow the foldable display panel FP to be stably maintained in the second configuration. Accordingly, in the second configuration, the first and second coupling portions c1 and c2 can be provided at positions corresponding to each other.

The first and second coupling portions c1 and c2 can be realized in various embodiments. For example, the first and second coupling portions c1 and c2 can have different magnetic polarities from each other. As a result, in the second configuration, when the first and second coupling parts c1 and c2 are sufficiently close to each other, the first and second coupling parts c1 and c2 can be connected to each other due to their magnetic properties. In addition, the first and second coupling portions c1 and c2 can be mechanically or structurally connected to each other.

Figure 3:
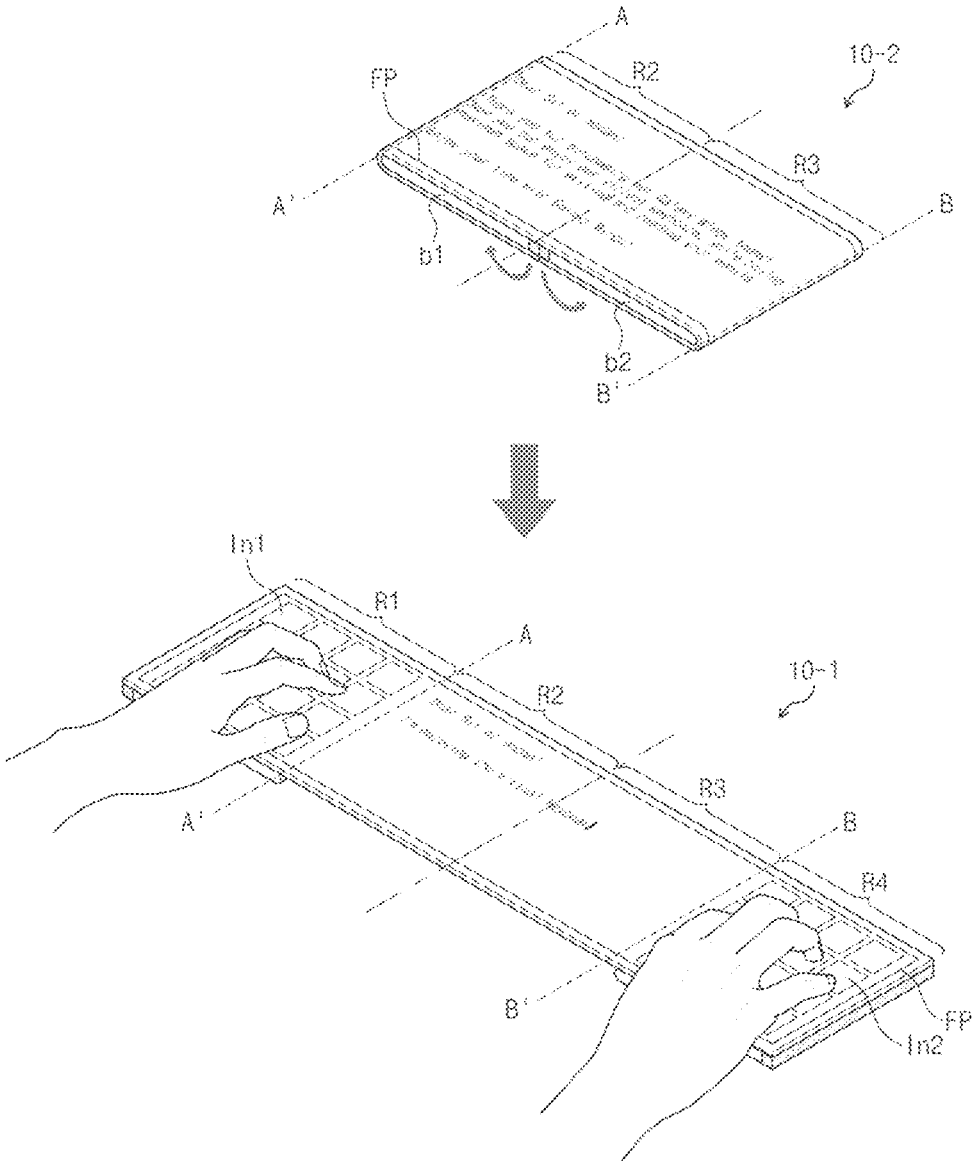
FIG. 3 illustrates an embodiment a foldable display which is controlled depending on a configuration of a foldable display panel.

FIG. 3 illustrates an embodiment of a foldable display controlled depending on a configuration of a foldable display panel.

Referring to FIG. 3, the foldable display 10-1 or 10-2 can control a display operation of the foldable display panel FP in response to a configuration of the foldable display panel FP. In particular, the foldable display 10-1 or 10-2 can display an image in response to the folded configuration of the foldable display panel FP.

The foldable display 10-1 can display images in the first region R1 to the fourth region R4 in response to the first configuration of the foldable display panel FP. Also, the foldable display 10-2 can display various images on the second and third regions R2 and R3 in response to the second configuration of the foldable display panel FP.

Herein, the images may refer to a variety of visual information, such as a still image or a moving image that can be viewed by a user.

In an embodiment, the foldable display 10-2 can display images regarding incoming events generated or received by the foldable display 10-2 on the second and third regions R2 and R3 when the second configuration is detected. Here, the incoming events indicate various events, such as a call, a message, and/or a notification received by the foldable display 10-2.

When the foldable display panel FP is converted from the second configuration into the first configuration, the foldable display 10-1 can respectively display, on the first and fourth regions R1 and R4, first and second input interfaces In1 and In2 for images which are being displayed on the second and third regions R2 and R3 in the second configuration. More specifically, the foldable display 10-1 can display the first input interface In1 for the image and the second input interface In2 for the image on the first region R1 and the fourth region R4. The second input interface In2 can indicate an interface that continues from the first input interface In1.

For example, while the foldable display panel FP displays images for received messages on the second and third regions R2 and R3 in the second configuration, when the foldable display panel FP is converted to the first configuration, the first and second interfaces In1 and In2 for receiving user inputs for the received messages can be respectively displayed on the first and fourth regions R1 and R4, In this embodiment, the first and second interfaces Inl and In2 can be keyboard input interfaces for the received messages. Especially, the first interface In1 and the second interface In2 can be a left keyboard input interface for a left hand input and a right keyboard input interface for a right hand input.

Accordingly, the user confirms the received messages displayed in the foldable display panel FP in the second configuration and then can convert the folded configuration of the foldable display panel FP from the second configuration into the first configuration without an additional input to simply display the input interfaces In1 and In2 with respect to the received messages.

Further, the foldable display 10-1 or 10-2 can perform various functions and display various input interfaces in response to the first and second configurations of the foldable display panel FP. However, the described technology is not limited to the aforementioned embodiments.

Figure 4A:
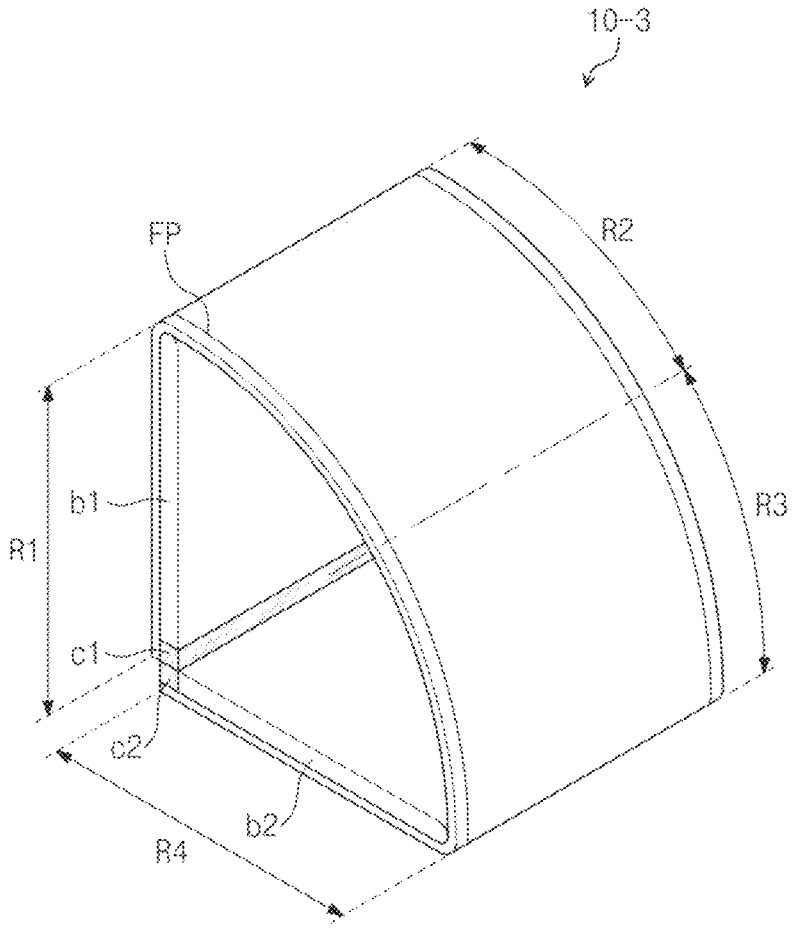
FIGS. 4A and 4B illustrates perspective views of a foldable display including a foldable display panel in a third configuration.
Figure 4B:
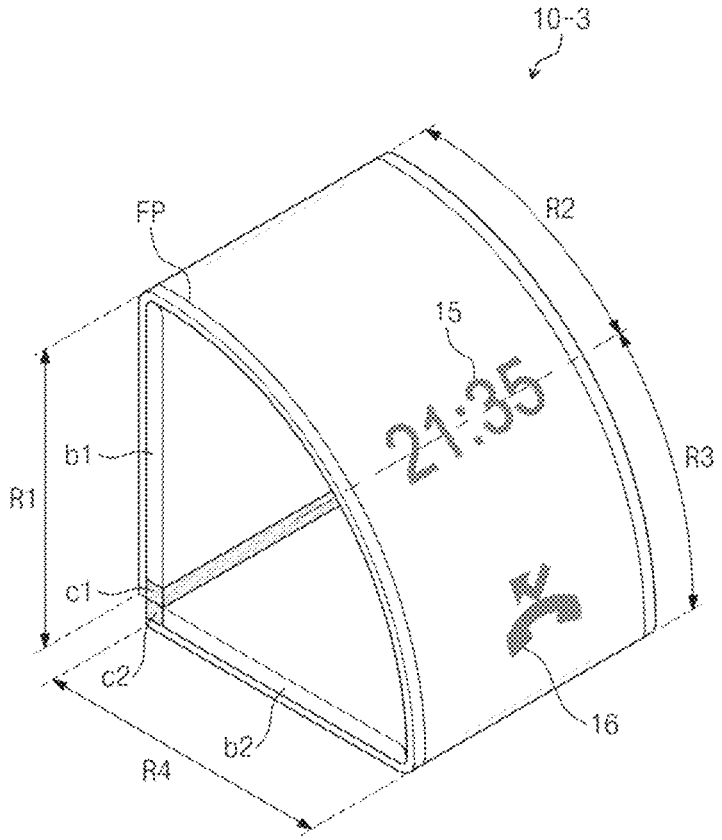

FIGS. 4A and 4B perspective views illustrating a foldable display including a foldable display panel in a third configuration.

Referring to FIGS. 4A and 4B, the foldable display panel FP can have a third configuration in which the first and second bodies b11 and b2 are connected to each other to form an angle, for example, a right angle. In the third configuration, the first and second coupling portions c1 and c2 of the first and second bodies b1 and b2 are connected to each other vertically. As a result, the second and third regions R2 and R3 can be curved. At this time, the second and third regions R2 and R3 can be separated from the first and second bodies b1 and b2 in the curved configuration.

In the third configuration of the foldable display panel FP, a foldable display 10-3 can selectively activate only the second and third regions R2 and R3. The second and third regions R2 and R3 activated in the third configuration can be used as regions that provide a variety of information to the user in real time.

For example, in the third configuration, the second and third regions R2 and R3 of the foldable display panel FP can display a variety of information regarding the surrounding environment, such as the current time 15, current date, current day of the week, current weather, and current temperature. The second and third regions R2 and R3 of the foldable display panel FP in the third configuration can update and display current surrounding environmental information in real time.

Also, in the third configuration, the second and third regions R2 and R3 of the foldable display panel FP can display visual notifications with respect to incoming events generated in the foldable display 10-3. For example, in the third configuration, the second and the third regions R2 and R3 of the foldable display panel FP can display information on a received message, a received call, a notification, and/or an alarm as visual notifications such as an icon 16.

Additionally, in the third configuration, the second and the third regions R2 and R3 of the foldable display panel FP can provide a variety of information in addition to the aforementioned embodiments to the user in real time. However, the described technology is not limited to the aforementioned embodiments.

Figure 5A:
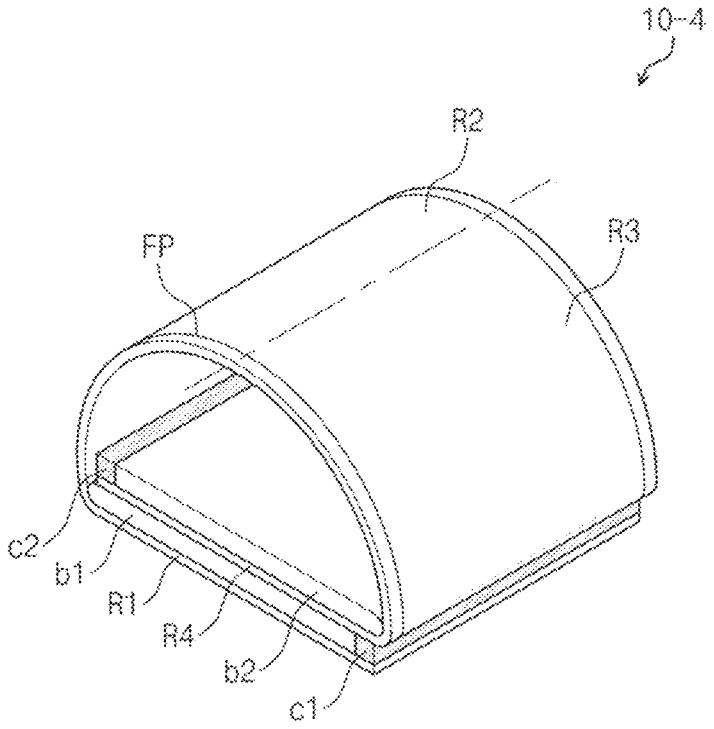
FIGS. 5A and 5B illustrates perspective views of a foldable display including a foldable display panel in a fourth configuration.
Figure 5B:
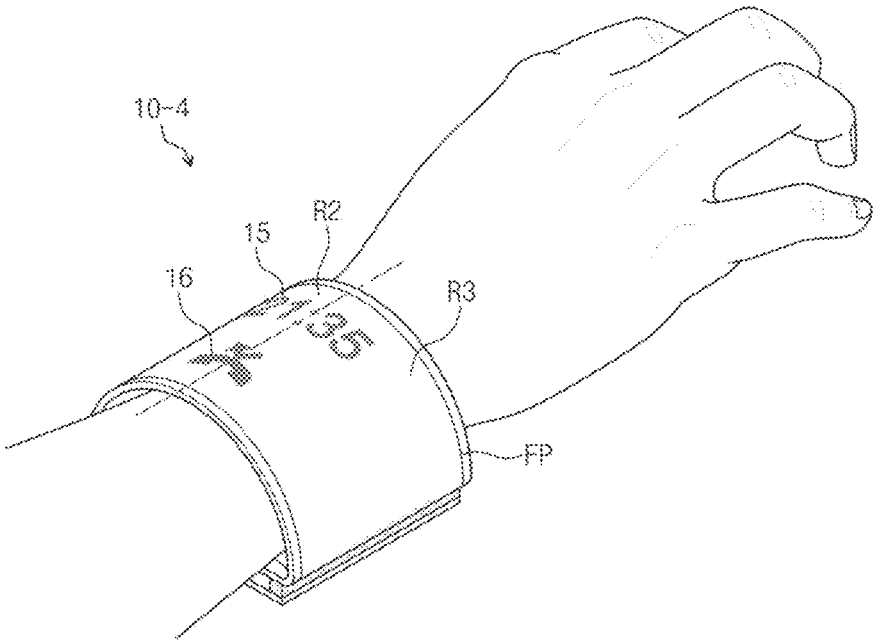

FIGS. 5A and 5B are perspective views illustrating a foldable display including a foldable display panel in a fourth configuration.

Referring to FIGS. 5A and 5B, the foldable display panel FP can be folded such that the first and second bodies b1 and b2 overlap each other and thus have a fourth configuration in which the second and third regions R2 and R3 are curved. When the second body b2 overlaps the first body b1 as illustrated in FIGS. 5A and 5B, the first region R1, the first body b1, the fourth region R4, and the second body b2 can be sequentially stacked. When the first body b1 overlaps the second body b2, the fourth region R4, the second body b2, the first region R1, and the first body b1 can be sequentially stacked.

In the fourth configuration, as the second and third regions R2 and R3 are curved and are separated from the first and second bodies b1 and b2, a predetermined space is formed inside the foldable display panel FP. At this time, the user may place a portion of their body in the formed space and thus wear the foldable display panel FP in the fourth configuration. In this embodiment, the foldable display 10-4 can perform a similar function to a wearable device. For example, the foldable display 10-4 can perform a similar function to a smart watch. Further, the first and second bodies b1 and b2 can be provided with coupling portions such that the fourth configuration is stably maintained.

In the fourth configuration, since it may be difficult for a user to view the first and fourth regions R1 and R4 of the foldable display panel FP, the first and fourth regions R1 and R4 can be inactivated in order to reduce power consumption. The aforementioned embodiments relating to FIGS. 4A and 4B can be applied to the selectively activated second and third regions R2 and R3 in a similar manner. For example, information on current surrounding environments 15 and visual notifications 16 relating to incoming events can be provided to the second and third regions R2 and R3. However, the described technology is not limited to the aforementioned embodiments. In another embodiment, in the fourth configuration, the second and the third regions R2 and R3 of the foldable display panel FP can provide a variety of information to the user in real time.

Figure 6:
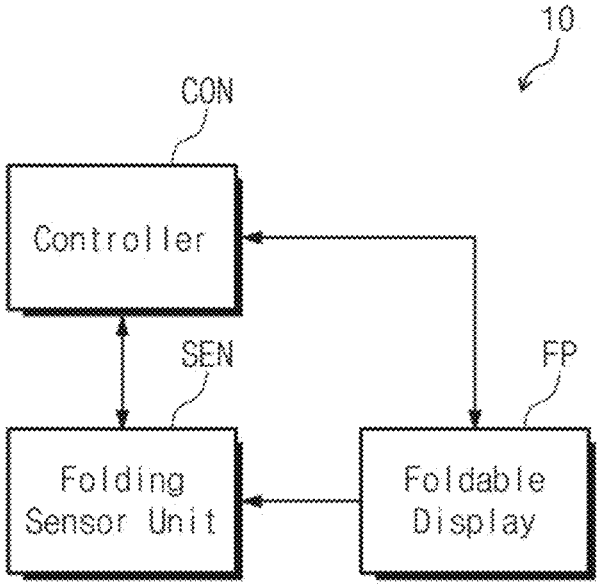
FIG. 6 illustrates a block diagram of a foldable display according to an embodiment.

FIG. 6 is a block diagram of a foldable display according to an embodiment. Depending on embodiments, certain elements may be removed from or additional elements may be added to the foldable display 10 illustrated in FIG. 6.

Furthermore, two or more elements may be combined into a single element, or a single element may be realized as multiple elements.

Referring to FIG. 6, the foldable display 10 includes a foldable display panel FP, a folding sensor SEN, and a controller CON.

The foldable display panel FP can display an image. The foldable display panel FP refers to a display manufactured on a flexible substrate that is bendable, foldable, or rollable without a loss of display properties. For example, the foldable display panel FP can be an organic light-emitting diode (OLED) display or an electrophoretic display (EPD) panel. Therefore, when the foldable display 10 is folded, the display properties of the foldable display panel FP are not damaged.

As described above relating to FIGS. 1A to 5B, the foldable display panel FP can have the first to fourth regions R1 to R4 adjacent to each other in a horizontal direction. A first body b1 and a second body b2 can be respectively located on a rear surface of the first region R1 and a rear surface of the fourth region R4.

The foldable display panel FP can have first and fourth configurations according to a folded configuration. The first configuration can be a configuration in which the foldable display panel FP is unfolded such that the first region R1 and the fourth region R4 are respectively supported by the first body b1 and the second body b2. A description thereof is the same as the description in FIGS. 1A and 1B. The second configuration can be a configuration in which the foldable display panel FP is folded such that the first and second regions R1 and R2 and the third and fourth regions R3 and R4 are respectively supported by the first body b1 and the second body b2. A description thereof is the same as the description in FIGS. 2A and 2B. The third configuration can be a configuration in which the foldable display is folded such that the first and second bodies b1 and b2 forms a right angle such that the second and third regions R2 and R3 are curved. A description thereof is the same as the description in FIGS. 4A and 4B. The fourth configuration can be a configuration in which the foldable display panel FP is folded such that the first and second bodies b1 and b2 overlap each other such that the second and third regions R2 and R3 are curved. A description thereof is the same as the description in FIGS. 5A and 5B.

The foldable display panel FP can include at least one touch sensor to sense various user inputs with respect to a surface of the foldable display panel FP.

The foldable display panel FP can communicate with the controller CON and can be controlled by the controller CON. In particular, in the foldable display panel FP, each region can be selectively activated according to the folded configuration by the controller CON, and a display operation of the activated region can be controlled.

The folding sensor SEN can sense the folded configuration of the foldable display panel FP. The folding sensor SEN can include various sensing units or sensors for sensing the folded configuration of the foldable display panel FP. For example, the folding sensor SEN can include a proximity sensor, a touch sensor, a piezo sensor, and/or a pressure sensor. The folding sensor SEN can be formed on the foldable display panel FP in order to sense the folded configuration of the foldable display panel FP.

The folding sensor SEN can communicate with the controller CON and can be controlled by the controller CON.

The controller CON can communicate with constituent elements of the foldable display 10, for example, the foldable display panel FP and the folding sensor SEN to control the constituent elements.

In particular, in the present specification, the controller CON can communicate with the folding sensor SEN to detect the folded configuration of the foldable display panel FP. The controller CON can control display operations of the foldable display panel FP with respect to the folded configuration of the foldable display panel FP detected using the folding sensor SEN. The controller CON can control activation for each region of the foldable display panel FP according to the folded configuration and control a display operation of an activated region.

For example, when the controller CON detects a first configuration of the foldable display panel FP, the controller CON can activate the first to fourth regions R1 to R4. When the controller CON detects a second configuration of the foldable display panel FP, the controller CON can activate the first to fourth regions R1 to R4 to function as a dual-side display. When the controller CON detects a conversion from the second configuration to the first configuration, the controller CON can additionally display interfaces with respect to images displayed in the second configuration on the first and fourth regions R1 and R4. A detailed description thereof is the same as the description in the FIG. 3.

When the controller CON detects the third and fourth configurations of the foldable display panel FP, the controller CON can activate the second and third regions R2 and R3. In this embodiment, the second and third regions R2 and R3 can provide real-time information on the current surrounding environment and visual notifications relating to the incoming events. A description thereof is the same as the description in FIGS. 4A to 5B.

In the present specification, for convenience in description, the controller CON and the foldable display 10 have been described to be the same.

In FIG. 6, respective blocks are constituent units of the foldable display 10 and are separately illustrated to be logically discriminated. Therefore, the constituent units of the display 10 described above can be mounted on a single chip or on a plurality of chips according to design considerations.

According to at least one embodiment, a foldable display can be converted to various configurations and provide various user interfaces such that a user can more efficiently and conveniently use the foldable display.

Although the respective drawings have been described individually for convenience of explanation, embodiments of the foldable display can be designed such that the embodiments illustrated in the respective drawings can be merged to realize a new embodiment. Further, the foldable display is not limited to the configurations and methods of the above-described embodiments, but all or some of the respective embodiments may be selectively combined and executed so that various modifications can be made within the scope of the described technology.

Although embodiments of the inventive technology have been illustrated and described, the invention is not limited to the above-mentioned embodiments and various modified embodiments may be available to those skilled in the art without the scope of the appended claims. In addition, these modified embodiments should not be appreciated separately from technical spirits or prospects of the inventive technology.

What is claimed is:

[1. A foldable display, comprising:

a foldable display panel including: i) a first region and a second region adjacent to each other in a first direction, and ii) a third region and a fourth region adjacent to each other in the first direction;

a first support located on a rear surface of the first region; and a second support located on a rear surface of the fourth region, wherein the foldable display panel is configured to be arranged in a first configuration in which the foldable display panel is unfolded so that i) the first support supports the first region and the second support supports the fourth region and ii) the second and third regions are unsupported, wherein the foldable display panel is further configured to be arranged in a second configuration in which the foldable display panel is folded so that the first support supports the first region and the second region and the second support supports the third region and the fourth region, and wherein the second configuration is a configuration in which: i) the first region and the second region oppose each other with the first support therebetween and ii) the third region and the fourth region oppose each other with the second support therebetween.]

[2. The foldable display of claim 1, wherein the first support comprises a first coupling portion and the second support comprises a second coupling portion, wherein the first coupling portion and the second coupling portion are configured to be connected to each other in the second configuration of the foldable display panel.]

[3. The foldable display of claim 2, wherein the first coupling portion and the second coupling portion have different magnetic polarities from each other.]

[4. The foldable display of claim 2, wherein the second configuration is a configuration in which: i) the foldable display panel is folded along a boundary line between the first and second regions such that the first support is arranged on rear surfaces of the first and second regions to support the first and second regions at the same time, and ii) the foldable display is folded along a boundary line between the third and fourth regions such that the second support is arranged on rear surfaces of the third and fourth regions to support the third and fourth regions at the same time.]

[5. The foldable display of claim 2, wherein the foldable display panel is further configured to be arranged in a third configuration in which the first and second coupling portions are connected to each other such that the first support and the second support form a right angle and the second region and the third region are curved.]

[6. The foldable display of claim 5, wherein the foldable display panel is further configured to be arranged in a fourth configuration in which the foldable display panel is folded such that the first support and the second support overlap each other and the second region and the third region are curved.]

[7. The foldable display of claim 6, further comprising:

a folding sensor configured to sense the configuration of the foldable display panel; and a controller configured to: i) communicate with the folding sensor to detect the configuration of the foldable display panel, and ii) control the foldable display panel based on the detected configuration.]

[8. The foldable display of claim 7, wherein the controller is further configured to control the foldable display panel such that the first region displays a first input interface and the fourth region displays a second input interface when the controller detects that the foldable display panel is in the second configuration.]

[9. The foldable display of claim 8, wherein the second input interface continues from the first input interface.]

[10. The foldable display of claim 9, wherein the first interface and the second interface are keyboard input interfaces.]

[11. The foldable display of claim 8, wherein the controller in further configured to control the foldable display panel such that the first region displays the first input inter face and the fourth region displays the second input interface when the controller detects a conversion of the foldable display panel from the first configuration to the second configuration, and wherein the first input interface and the second input interface are interfaces that are based on images displayed by the second and third regions in the first configuration.]

[12. The foldable display of claim 7, wherein the controller is further configured to control the foldable display panel such that the second and third regions are activated when the controller detects that the foldable display panel is in the third configuration.]

[13. The foldable display of claim 7, wherein the controller is further configured to control the foldable display such panel that the first or fourth region is inactive when the controller detects that the foldable display panel is in the fourth configuration.]

[14. The foldable display of claim 1, wherein sizes of the first and second regions are substantially the same, and sizes of the third and fourth regions are substantially the same.]

[15. A foldable display, comprising:

a foldable display panel including: i) a first region and a second region adjacent to each other in a first direction, and ii) a third region and a fourth region adjacent to each other in the first direction;

a first support located on a rear surface of the first region; and a second support located on a rear surface of the fourth region, wherein the foldable display panel is configured to be arranged in a first configuration in which the foldable display panel is unfolded so that the first support supports the first region and the second support supports the fourth region, wherein the foldable display panel is further configured to be arranged in a second configuration in which the foldable display panel is folded so that the first support supports the first region and the second region and the second support supports the third region and the fourth region, wherein the second configuration is a configuration in which: i) the first region and the second region oppose each other with the first support therebetween and ii) the third region and the fourth region oppose each other with the second support therebetween, and wherein, in the second configuration, the first support contacts the first region and the second region, and the second support contacts the third region and the fourth region.]

*16. A foldable display, comprising:*

*a display panel comprising a first display area, a second display area, and a third display area, each of the first through third display areas being configured to display images using light-emitting elements; and*

*a first support disposed below the first display area; and*

*a second support disposed below the third display area, wherein*

*the display panel is configured to be arranged in a folded configuration, and an unfolded configuration in which the second display area is unsupported,*

*in the folded configuration, the display panel is folded based on a first axis and a second axis, the first support is disposed between the first and second display areas which oppose and face away from one another, and the second support is disposed between the second and third display areas which oppose and face away from one another, and*

*in the unfolded configuration, a first side of the first support facing the second support and a second side of the second support facing the first support have a radius of curvature.*

*17. The foldable display of claim 16, wherein the first to the third display areas are exposed to an outside of the display panel when the display panel is folded in the folded configuration such that the first display area and the third display area are disposed beneath and oppose the second display area.*

*18. The foldable display of claim 16, wherein the first axis corresponds to a boundary between the first display area and the second display area, and the second axis corresponds to a boundary between the second display area and the third display area.*

*19. The foldable display of claim 16, wherein the first display area, the second display area, and the third display area are configured to display an image through a continuously extended area.*

*20. The foldable display of claim 16, wherein the first support supports the first display area in the unfolded configuration, and the second support supports the third display area in the unfolded configuration.*

*21. The foldable display of claim 16, wherein the display panel is configured to display an image through the second display area in the folded configuration.*

*22. The foldable display of claim 16, wherein the display panel is configured to display an image through the first display area, the second display area, and the third display area in the unfolded configuration.*

*23. The foldable display of claim 16, wherein the display panel is configured to display an image through the first display area, the second display area, and the third display area in the folded configuration and the unfolded configuration.*

*24. The foldable display of claim 16, wherein the display panel is further configured to be arranged in a curved configuration in which the second display area of the display panel is curved, and*

*the first display area and the third display area overlap each other in the curved configuration.*

*25. The foldable display of claim 16, wherein the first support is disposed below the first display area to keep the first display area flat, the first support defines a boundary between the first display area and the second display area where the display panel folds, and*

*the second support is disposed below the third display area to keep the third display area flat, the second support defines a boundary between the third display area and the second display area where the display panel folds.*

*26. The foldable display of claim 16, wherein the second display area is adjacent to the first display area and has an area larger than that of the first display area, and*

*the third display area is adjacent to the second display area and has an area smaller than that of the second display area.*

*27. The foldable display of claim 16, wherein the first display area and the third display area each include a coupling portion that, in the folded configuration, connect so as to couple the first display area to the third display area and maintain a stable folded configuration.*

*28. The foldable display of claim 27, wherein the first support supports the first display area and the second display area in the folded configuration, and the second support supports the third display area and the second display area in the folded configuration.*

*29. The foldable display of claim 16, wherein*

*each of the first through third display areas are configured to display a plurality of visual information including a still image and a moving image, and*

*at least one of the first through third display areas includes a touch sensor to sense user inputs with respect to a surface of the at least one of the first through third display areas.*

*30. An electronic device comprising a foldable display, comprising:*

*a display panel in which a first folding axis and a second folding axis are defined and comprising a first display area, a second display area, and a third display area;*

*a first support disposed below the first area of the display panel; and*

*a second support disposed below the third area of the display panel,*

*wherein, when the display panel is in a flat state, the second area of the display panel between the first area and the third area is not supported by any support,*

*when the display panel is folded based on the first folding axis and the second folding axis, the first support is disposed between the first area and the second area which oppose and face away from one another, and the second support is disposed between the second area and the third area which oppose and face away from one another, and*

*when the display panel is in the flat state, a first side of the first support facing the second support and a second side of the second support facing the first support have a radius of curvature.*

*31. The electronic device of claim 30, wherein the first folding axis and the second folding axis are spaced apart in a first direction, and the first area, the second area, and the third area are sequentially arranged in the first direction.*

*32. The electronic device of claim 31, when the display panel is in the flat state, the first support and the second support are spaced apart in the first direction.*

*33. The electronic device of claim 31, wherein a width of the second area in the first direction is greater than each of a width of the first area in the first direction and a width of the third area in the first direction.*

*34. The electronic device of claim 30, wherein the first area and the third area are maintained in a flat state by the first support and the second support, respectively.*

*35. The electronic device of claim 30, wherein the first to the third areas are exposed to an outside of the display panel when the display panel is folded, and the display panel is configured to display an image through the first to the third areas.*

*36. The electronic device of claim 30, wherein the first to the third areas are exposed to an outside of the display panel*

*when the display panel is folded, and the display panel is configured to display an image through the second area.*

* * * * *